(12) United States Patent
Shimony et al.

(10) Patent No.: US 11,620,129 B1
(45) Date of Patent: Apr. 4, 2023

(54) AGENT-BASED DETECTION OF FUZZING ACTIVITY ASSOCIATED WITH A TARGET PROGRAM

(71) Applicant: CyberArk Software Ltd., Petach-Tikva (IL)

(72) Inventors: Eran Shimony, Petach-Tikva (IL); Mark Cherp, Petach-Tikva (IL); Nir Chako, Petach-Tikva (IL)

(73) Assignee: CyberArk Software Ltd., Petach-Tikva (IL)

(*) Notice: Subject to any disclaimer, the term of this patent is extended or adjusted under 35 U.S.C. 154(b) by 0 days.

(21) Appl. No.: 17/749,306

(22) Filed: May 20, 2022

(51) Int. Cl.
  *G06F 8/75* (2018.01)
  *G06F 21/57* (2013.01)
  *G06F 9/54* (2006.01)

(52) U.S. Cl.
  CPC .............. *G06F 8/75* (2013.01); *G06F 9/545* (2013.01); *G06F 21/577* (2013.01)

(58) Field of Classification Search
  None
  See application file for complete search history.

(56) References Cited

U.S. PATENT DOCUMENTS

| | | | |
|---|---|---|---|
| 9,530,007 B1 * | 12/2016 | Allen | G06F 11/3688 |
| 11,249,888 B1 * | 2/2022 | Campos Perez | G06F 11/3684 |
| 2017/0212829 A1 * | 7/2017 | Bales | G06N 3/0454 |
| 2018/0232523 A1 * | 8/2018 | Copty | G06F 21/577 |

OTHER PUBLICATIONS

Goransson & Edholm, Escaping the Fuzz, Evaluating Fuzzing Techniques and Fooling them with Anti-Fuzzing, 2016, Chalmers University of Technology, Gothenburg, Sweden.
Jung, Solodukhln, Pagan, Lee, & Kim, Fuzzification: Anti-Fuzzing Techniques, Aug. 14, 2019, 28th USENIX Security Symposium, Santa Clara, CA, USA; 978-1-939133-06-9.
Van Der Walt, When the Tables Turn, A discussion paper on passive strike-back, Sep. 2004, SensePost Research, Brooklyn, South Africa.

* cited by examiner

*Primary Examiner* — Qing Chen
(74) *Attorney, Agent, or Firm* — Finnegan, Henderson, Farabow, Garrett & Dunner L.L.P.

(57) ABSTRACT

Disclosed embodiments relate to systems and methods for detecting fuzzing activity associated with a target program. Techniques include accessing a target program, monitoring, by a monitoring agent in a kernel space environment, the target program, and analyzing dynamic and static patterns of the target program. The techniques may further include assessing process parameters and inputs, evaluating instrumentation patterns in at least one basic block, assessing process creation frequency, assessing Syscalls invocation frequency, identifying suspicious processes, or comparing a runtime coverage ratio of a process to an expected coverage ratio. Systems and methods may also include calculating a confidence score, including applying a weighted value to an analyzed individual pattern based on the analysis, and identifying a likelihood of fuzzing activity based on the confidence score.

20 Claims, 7 Drawing Sheets

AGENT-BASED DETECTION OF FUZZING ACTIVITY ASSOCIATED WITH A TARGET PROGRAM

BACKGROUND

Fuzzing is an automated software testing technique used to discover vulnerabilities (e.g., hackable software bugs) by inputting invalid, unexpected, or random data into a computer program. A fuzzer may input large amounts of data, referred to as fuzz, into a target computer program. The fuzzer may then monitor the computer program for crashes or information leakage and identify the causes of the failure. Fuzzers can uncover bugs in target software that would not have been detected through conventional testing methods. Fuzzing may work for discovering vulnerabilities exploited by, for instance, SQL injection, buffer overflow, denial of service, or cross-site scripting.

There are several types of fuzzers. A dumb fuzzer may attack a computer program without prior analysis of the program itself. Dumb fuzzing techniques may involve inputting data into a program without prior knowledge of the program and monitoring the program to determine if any vulnerabilities are discovered. The input data selected may be random, without a specific target or goal. A mutation-based fuzzer alters valid existing data samples to generate new test data. The mutation-based fuzzer may randomly alter the known valid inputs to attempt to gain unauthorized access to areas of a program. A generation-based fuzzer generates new inputs, rather than mutating known inputs, based on a specification. A generation-based fuzzer generates the inputs after analyzing the target program and utilizes knowledge from that analysis to generate inputs that may result in successful entry into the program. The fuzzer may then define new inputs based on the reaction of the target software program to the previous inputs.

Software engineers may use fuzz testing to discover software vulnerabilities and thus determine the security and quality of their programming. Because fuzzers are an automated testing technique, they can run without human intervention to locate and flag software bugs. This is beneficial in software testing because fuzz testing can both identify the software vulnerabilities and identify the specific inputs that caused the vulnerability. Further, because of the automated nature of fuzzing, fuzzers can uncover bugs that would not have been discovered through conventional testing methods. Fuzz testing may provide a beneficial complement to traditional software testing techniques.

A problem arises when hackers use fuzzers to discover and exploit vulnerabilities in target programs. There has been a rapid rise in the use of fuzzers by hackers as a tool to discover zero-day vulnerabilities, which are vulnerabilities in a system that have been discovered but not yet patched. Such vulnerabilities pose a security risk because they are discovered by the hacker before security researchers and software developers have become aware of such vulnerabilities. Fuzzers have been used for several decades, and existing approaches to combatting malicious fuzzing focus on disorienting the fuzzer and hardening the static binary image of the software. For example, one approach to hindering a fuzzer involves amplifying the slowdown in normal executions by hundreds of times to the fuzzed execution, interfering with feedback logic by hiding paths and polluting coverage maps, and hindering taint analysis and symbolic execution. Other approaches to combat fuzzing include exiting the target program if a fuzzer is detected, allowing a program to handle crashes internally without revealing to the fuzzer that the program has crashed, or manipulating the metrics that are collected by the fuzzer.

Although there have been attempts to protect programs from active fuzzing, these solutions focus primarily on disorienting the fuzzer. New solutions are needed to ensure the protection of software programs from malicious hacking using fuzzers. Such solutions should provide detection of an active fuzzer. Having the ability to detect an active fuzzer may compromise the benefits to hackers of using a fuzzer by making vulnerability discovery more difficult. By focusing on behavioral analysis, fuzzers can be detected while actively searching for software vulnerabilities. For example, by identifying static and dynamic patterns of active fuzzers, a monitoring agent may be able to discover an active fuzzer and provide security alerts based on that identification.

SUMMARY

The disclosed embodiments describe computer-implemented methods and non-transitory computer readable media for detecting fuzzing activity associated with a target program. For example, in an embodiment, the computer implemented method may comprise accessing a target program, monitoring the target program by a monitoring agent in a kernel space, analyzing dynamic and static patterns of the target program, calculating a confidence score by applying a weighted value to an analyzed individual pattern based on the analysis, and identifying the likelihood of fuzzing activity based on the confidence score. In some embodiments, analyzing dynamic and static patterns of the target program may comprise assessing process parameters and inputs, evaluating instrumentation patterns in at least one basic block, assessing process creation frequency, assessing Syscalls invocation frequency, identifying suspicious processes, or comparing a runtime coverage ratio of a process to an expected coverage ratio.

According to a disclosed embodiment, the computer-implemented method may further include assessing process parameters and inputs by examining a similarity of two or more process environment blocks or process control blocks, or monitoring process command line arguments and external inputs.

According to a disclosed embodiment, assessing process parameters and inputs may include detecting external inputs through open handles, file descriptors, shared memory, or external API calls.

According to a disclosed embodiment, assessing process parameters and inputs may comprise identifying a first input, comparing subsequent inputs to the first input to measure covariance of the subsequent inputs to identify input mutation, and comparing the covariance to statistical thresholds of known fuzzing mutation methods.

According to a disclosed embodiment, evaluating instrumentation patterns may include identifying a report by the at least one basic block to a repository associated with the target program.

According to a disclosed embodiment, evaluating instrumentation patterns may include performing a static analysis of a source code file.

According to a disclosed embodiment, assessing process creation frequency may comprise identifying process unique identifiers of a first process, identifying immutable sections of the first process by calculating a cryptographic hash of a section of the process code, and determining a degree of variation of at least one subsequent process based on the unique identifiers and the immutable sections of the first process.

According to the disclosed embodiments, assessing process creation frequency may comprise comparing base images of a first and second process, comparing process names of a first or second process, or examining process environment block or process control blocks for common structure.

According to a disclosed embodiment, assessing Syscalls invocation frequency may comprise calculating baseline frequency of expected Syscalls, and comparing an invocation frequency to the baseline frequency. In some embodiments, the baseline frequency may be approximately five per second for a particular Syscall.

According to a disclosed embodiment, identifying suspicious processes may comprise identifying an existence of a state machine in a process shared memory or identifying correlations between a process's execution frequency and its structure update frequency.

According to a disclosed embodiment, an expected coverage ratio may be determined by building a runtime graph of the target process in a test environment and comparing the runtime graph to a static graph.

According to a disclosed embodiment, the test environment may include an isolated virtual machine that may be inaccessible to external fuzzers.

According to a disclosed embodiment, the runtime coverage ratio may be determined by comparing a runtime graph of the target process to a static graph of the target process.

According to a disclosed embodiment, the computer-implemented method may further comprise performing a security action based on the confidence score. In some embodiments, the security action may include generating an alert, generating a report, blocking an action, allowing an action, suspending the target program, prompting a user for administrative approval, or revoking permissions.

According to a disclosed embodiment, the computer implemented method may further comprise verifying the integrity of the monitoring agent and establishing a trust relationship between the monitoring agent and the target program.

According to another disclosed embodiments, there may be a non-transitory computer readable medium that may include instructions that, when executed by at least one processor, cause the at least one processor to perform operations for detecting fuzzing activity attacking a target program. The operations may comprise monitoring the target program by a monitoring agent in a kernel space, calculating a confidence score based on a comparison of monitored dynamic and static patterns of the target program to a predefined fuzzer behavior profile, and identifying a likelihood of fuzzing activity based on the confidence score. Calculating the confidence score may include determining whether one or more dynamic and static patterns satisfies at least one element of the fuzzer behavioral profile and applying a weighted value to the determination.

According to a disclosed embodiment, determining whether one or more dynamic and static patterns satisfies at least one element of the fuzzer behavior profile may comprise assessing process parameters and inputs, evaluating instrumentation patterns in function prologues and epilogues, assessing process creation frequency, assessing Syscalls invocation frequency, identifying suspicious processes, or comparing a runtime coverage ration of the process to an expected coverage result.

According to a disclosed embodiment, the operations may include performing a security action based on the confidence score.

According to a disclosed embodiment, applying a weighted value to the determination may be based on an importance score assigned to elements of the fuzzer behavior profile.

Aspects of the disclosed embodiments may include tangible computer readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments.

BRIEF DESCRIPTION OF THE DRAWINGS

The accompanying drawings, which are incorporated in and constitute a part of this specification, illustrate disclosed embodiments and, together with the description, explain the disclosed embodiments.

DETAILED DESCRIPTION

In the following detailed description, numerous specific details are set forth to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence or constrained to a particular system configuration. Additionally, some of the described embodiments or elements thereof can occur or be performed simultaneously, at the same point in time, or concurrently.

The techniques for detecting fuzzing activity described herein overcome several technological problems relating to security, efficiency, and functionality in the field of cybersecurity and software management. In particular, the disclosed embodiments provide techniques for detecting active fuzzing activity present in a kernel and a user space environments. As discussed above, malicious actors may target specific programs using fuzzers to detect and exploit software vulnerabilities. Existing techniques fail to provide active detection of fuzzers based on fuzzer behavioral analysis.

The disclosed embodiments provide technical solutions to these and other problems arising from current techniques. For example, disclosed techniques create efficiencies over current techniques by examining behavioral patterns of active fuzzers to identify and alert users to active fuzzers. The disclosed techniques offer improvements over existing security techniques because the disclosed techniques detect active fuzzers and provide security alerts based on those detections. The disclosed techniques also provide a highly reliable solution in detecting active fuzzers in target programs and alerting users, which may render fuzzing ineffective and may protect software products from malicious attackers. The disclosed techniques for detecting active fuzzers may be further combined with security monitoring and enforcement programs. For these and other reasons that will be apparent to those skilled in the art, the disclosed techniques provide improved security, performance, and efficiency over existing techniques.

Reference will now be made in detail to the disclosed embodiments, examples of which are illustrated in the accompanying drawings.

Figure 1:
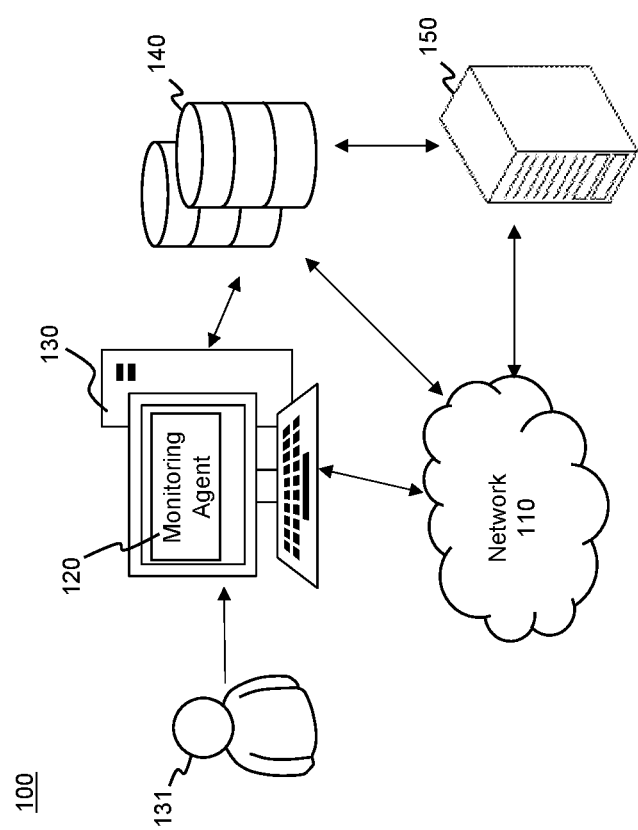
FIG. 1 is a block diagram of an exemplary system for detecting fuzzing activity associated with a target program in accordance with disclosed embodiments.

FIG. 1 illustrates an exemplary system 100 for detecting fuzzing activity associated with a target program, consistent with the disclosed embodiments. System 100 may represent an environment in which software code is developed and/or executed, for example in a cloud environment. System 100 may include one or more monitoring agents 120, one or more computing devices 130, one or more databases 140, and one or more servers 150, as shown in FIG. 1.

The various components may communicate over network 110. Such communication may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system 100 is shown as a network-based environment, it is understood that the disclosed systems and methods may also be used in a localized system, with one or more of the components communicating directly with each other.

Computing devices 130 may be a variety of different types of computing devices capable of developing, storing, analyzing, and/or executing software code. For example, computing device 130 may be a personal computer (e.g., a desktop or laptop), an IoT device (e.g., sensor, smart home appliance, connected vehicle, etc.), a server, a mainframe, a vehicle-based or aircraft-based computer, a virtual machine (e.g., virtualized computer, container instance, etc.), or the like. Computing device 130 may be a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home devices, industrial devices, etc.), or various other devices capable of processing and/or receiving data. Computing device 130 may operate using a Windows™ operating system, a terminal-based (e.g., Unix or Linux) operating system, a cloud-based operating system (e.g., through AWS™, Azure™, IBM Cloud™, etc.), or other types of non-terminal operating systems. As discussed further below, computing devices 130 may be used for developing and/or running software code, functions, or scripts. For example, a user 131 may develop software code through an Integrated Development Environment (IDE) 132 operated on computing device 130. Examples may include FileMaker™, Essential Studio™, Visual LANSA™, GeneXus™, and various others.

System 100 may further comprise one or more database(s) 140, for storing and/or executing software. For example, database 140 may be configured to store software or code, such as code developed using computing device 130. Database 140 may further be accessed by computing device 130, server 150, or other components of system 100 for downloading, receiving, processing, editing, or running the stored software or code. Database 140 may be any suitable combination of data storage devices, which may optionally include any type or combination of slave databases, load balancers, dummy servers, firewalls, back-up databases, and/or any other desired database components. In some embodiments, database 140 may be employed as a cloud service, such as a Software as a Service (SaaS) system, a Platform as a Service (PaaS), or Infrastructure as a Service (IaaS) system. For example, database 140 may be based on infrastructure of services of Amazon Web Services™ (AWS), Microsoft Azure™ Google Cloud Platform™, Cisco Metapod™, Joyent™, vmWare™, or other cloud computing providers. Data sharing platform 140 may include other commercial file sharing services, such as Dropbox™, Google Docs™, or iCloud™. In some embodiments, database 140 may be a remote storage location, such as a network drive or server in communication with network 110. In other embodiments database 140 may also be a local storage device, such as local memory of one or more computing devices (e.g., computing device 130) in a distributed computing environment.

System 100 may also comprise one or more server device(s) 150 in communication with network 110. Server device 150 may manage the various components in system 100. In some embodiments, server device 150 may be configured to process and manage requests between computing devices 130 and/or databases 140. In embodiments where software code is developed within system 100, server device 150 may manage various stages of the development process, for example, by managing communications between computing devices 130 and databases 140 over network 110. Server device 150 may identify updates to code in database 140, may receive updates when new or revised code is entered in database 140, and may participate in detecting fuzzing activity associated with a target program.

Monitoring agent 120 may be any device, component, program, script, or the like, for detecting fuzzing activity associated with a target program within system 100, as described in more detail below. In some embodiments, Monitoring agent 120 may be a program or script and may be executed by another component of system 100 (e.g., integrated into computing device 130, database 140, or server 150). Monitoring agent 120 may be implemented as a kernel module in the target environment. For example, monitoring agent 120 may be accessible to user 131 as a monitoring agent API in the user space while the monitoring agent 120 is implemented in the kernel space. Monitoring agent 120 may further comprise one or more components for performing various operations of the disclosed embodiments. For example, monitoring agent 120 may be configured to access and monitor a target program to analyze the dynamic and static patterns of the target program as discussed below. Monitoring agent 120 may further be configured to calculate a confidence score by applying a weighted value to an analyzed individual pattern to identify the likelihood of fuzzing activity based on the confidence score. The monitoring agent 120 may further be configured to perform a security action based on the confidence score, such as generating an alert, generating a report, blocking an action, allowing an action, suspending the targeting program, prompting a user for administrative approval, or revoking permissions.

Figure 2:
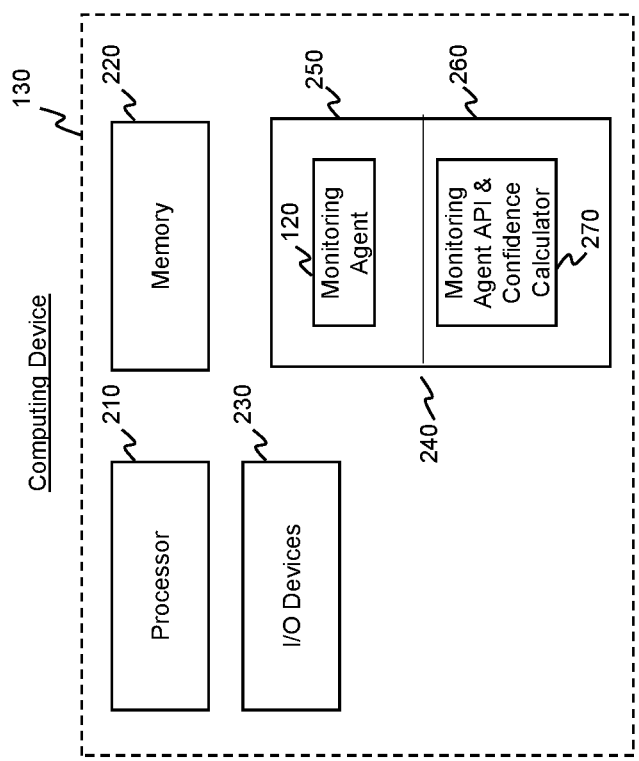
FIG. 2 is a block diagram showing an exemplary computing device including a monitoring agent for detecting fuzzing activity associated with a target program.

FIG. 2 is a block diagram showing an exemplary embodiment where computing device 130 includes monitoring agent 120. Computing device 130 may include a processor 210. Processor (or processors) 210 may include one or more data or software processing devices. For example, the processor 210 may take the form of, but is not limited to, a microprocessor, embedded processor, or the like, or may be integrated in a system on a chip (SoC). Furthermore, according to some embodiments, the processor 210 may be from the family of processors manufactured by Intel®, AMO®, Qualcomm®, Apple®, NVIDIA®, or the like. The processor 210 may also be based on the ARM architecture, a mobile processor, or a graphics processing unit, etc. The disclosed embodiments are not limited to any type of processor configured in the computing device 130.

Memory (or memories) 220 may include one or more storage devices configured to store instructions or data used by the processor 210 to perform functions related to the disclosed embodiments. Memory 220 may be configured to store software instructions, such as programs, that perform one or more operations when executed by the processor 210 to detect fuzzing activity attacking a target program, for example, using methods 400 and 500, described in detail below. The disclosed embodiments are not limited to software programs or devices configured to perform dedicated tasks. For example, the memory 220 may store a single program, such as a user-level application, that performs the functions of the disclosed embodiments, or may comprise multiple software programs. Additionally, the processor 210 may in some embodiments execute one or more programs (or portions thereof) remotely located from the computing device 130. Furthermore, the memory 220 may include one or more storage devices configured to store data (e.g., machine learning data, training data, algorithms, etc.) for use by the programs, as discussed further below.

Computing device 130 may further include one or more input/output (I/O) devices 230. I/O devices 230 may include one or more network adaptors or communication devices and/or interfaces (e.g., WiFi, Bluetooth®, RFID, NFC, RF, infrared, Ethernet, etc.) to communicate with other machines and devices, such as with other components of system 100 through network 110. For example, monitoring agent 120 may use a network adaptor to scan for code and code segments within system 100. In some embodiments, the I/O devices 230 may also comprise a touchscreen configured to allow a user to interact with monitoring agent API 270 and/or an associated computing device. The I/O devices 230 may comprise a keyboard, mouse, trackball, touch pad, stylus, and the like.

Computing device 130 may further comprise a virtual memory 240. Virtual memory 240 may include a memory management technique that addresses secondary memory as though it is part of main memory. For example, virtual memory 240 may enable a computer's operating system to map memory addresses used by a program into physical addresses in computer memory. The computer operating system may transfer pages of data from random access memory to disk storage to compensate for lack of physical memory. Virtual memory 240 may map memory addresses used by a program into physical addresses in computer memory. Virtual memory 240 may include a kernel space 250 and user space 260.

A kernel space 250 may include a computer program in a computer operating system's core. For example, a kernel space environment may facilitate interactions between hardware and software components. A kernel space environment may control hardware resources via device drivers, arbitrate conflicts between processes, monitor the amount of memory being used, and optimize the utilization of resources. The kernel space environment may include a monolithic kernel, micro-kernel, hybrid kernel, exokernel, nanokernel, or any other space that controls and monitors the hardware and software components of an operating system. A kernel space may be present in operating systems such as Linux™, Windows™, macOS™, iOS™ MINIX™, Android™, and other operating systems.

The user space 260 may include the portion of a computer's memory containing unprivileged processes run by a user. For example, user space 260 may refer to the programs and libraries used by the operating system to interact with the kernel space 250. User applications may operate in the user space 260 and users may have the ability to modify and erase data contained within the user space 250.

Aspects of the present disclosure may involve target programs. A target program may include any specific set of ordered operations for a computer to perform. For example, a target program may refer to an application program such as word processors, game programs, spreadsheets, database systems, graphics programs, web browsers, or any other application program utilized by users. A target program may also refer to systems programs such as operating systems, networking systems, database systems, programming language software, website servers, data backup, or any other system program used for monitoring and controlling hardware and software.

Aspects of the present disclosure may include detecting fuzzing activity in a target program. A fuzzing activity may include an automated software that inputs generated data into a target program to discover security vulnerabilities. A fuzzing activity may include a set of actions performed by an automated software to monitor a target program for crashes or memory leaks. For example, a fuzzing activity may include inputting into a target program invalid, unexpected, or random data or any other action that causes a failure or memory leak in the target program.

Figure 3A:
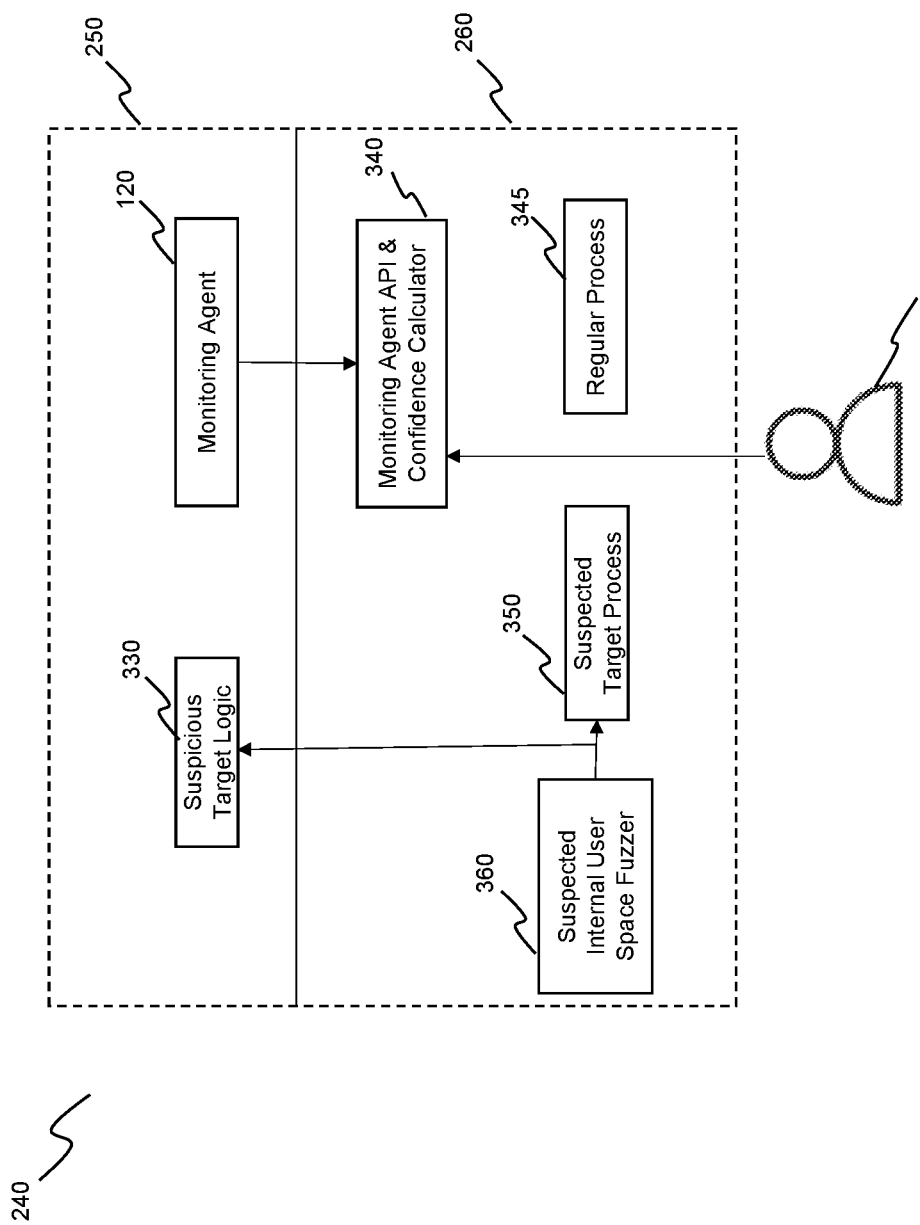
FIG. 3A is a block diagram showing an exemplary system for detecting an internal user space fuzzer associated with a target program.

FIG. 3A is a block diagram depicting an exemplary flow of a process within the virtual memory 240 for detecting fuzzing activity in a target program. The monitoring agent 120 may be installed in the form of a kernel module in the kernel space 250. A module may include pieces of code that can be loaded and unloaded into a kernel on demand. For example, a kernel module may include an object file that contains code that can extend the kernel functionality at runtime. When a kernel module is no longer needed, it may be unloaded. A kernel module may be used to add support for new hardware, such as device drivers or file systems, or for adding system calls ("Syscalls").

The monitoring agent application programming interface (API) and confidence calculator 340 may be accessible by a user such a user 131 operating in the user space 260. The monitoring agent API 340 may include a software intermediary that enables software components to communicate with each other using a set of definitions and protocols. For example, the monitoring agent API 340 may communicate with the monitoring agent installed in the kernel space 250. The monitoring agent API 340 may include a web API, rest API, SOAP API, Browser API, iOS/Android API, or any other type of application programming interface that facilitates communication between software components.

In one embodiment as shown in FIG. 3A, an internal user space fuzzer 360 may be present in the user space 260. An internal user space fuzzer 360 may be utilized to detect vulnerabilities in user software or may be installed by a malicious actor to exploit security vulnerabilities. For example, an internal user space fuzzer 360 may perform fuzzing operations on a target program. The internal user space fuzzer 360 may identify security vulnerabilities in a suspected target process 350 in user space 260. A suspected target process 350 may be a process in user space 260 that exhibits suspicious activity related to fuzzing. For example, a suspected target process 350 may be the target of the internal user space fuzzer 360. The suspected target process 350 may also be tied to suspicious target logic 330.

Figure 3B:
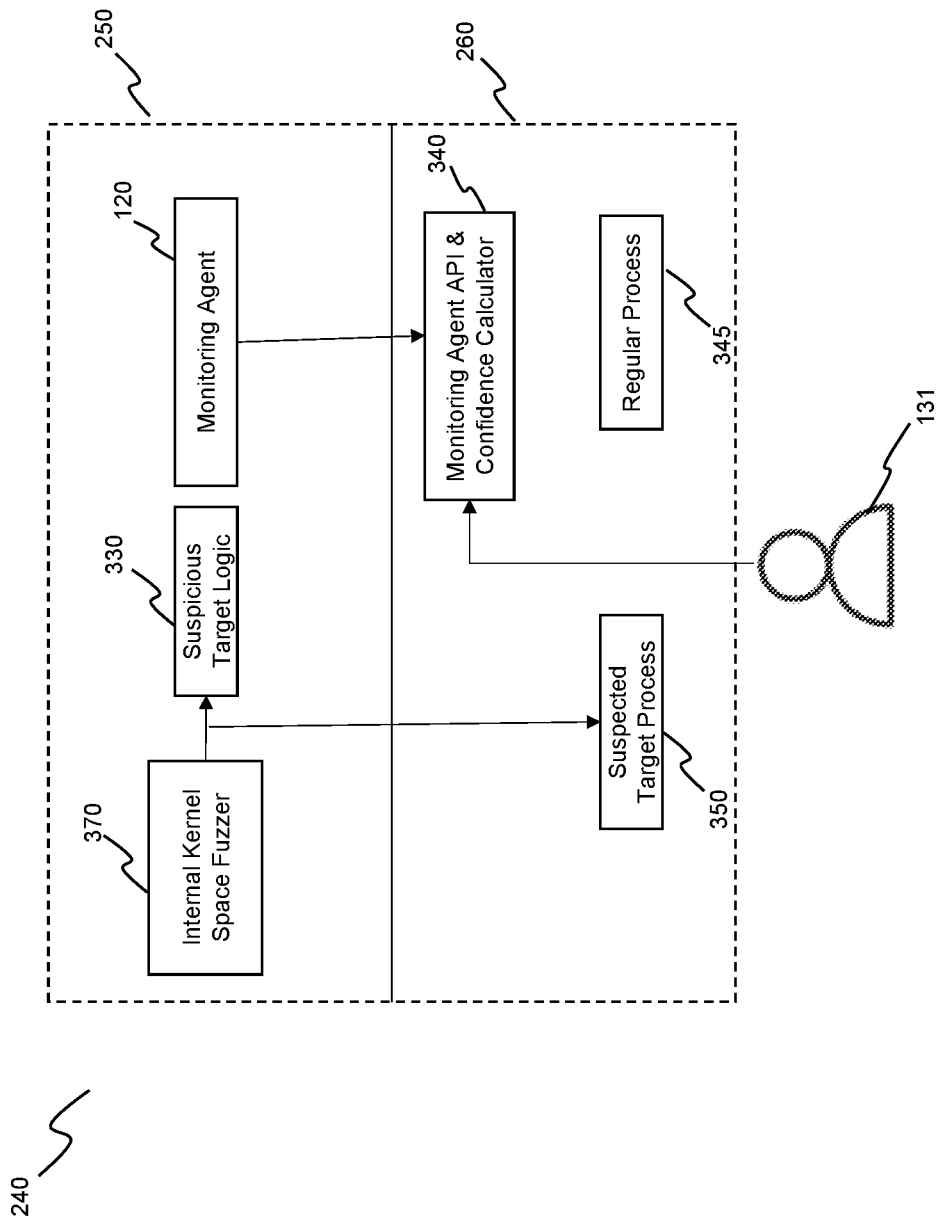
FIG. 3B is a block diagram showing an exemplary system for detecting an internal kernel space fuzzer associated with a target program.

In other embodiments as shown in FIG. 3B, an internal kernel space fuzzer 370 may be present in the kernel space 250. An internal kernel space fuzzer 370 may be utilized to detect vulnerabilities in the kernel space 250. For example, an internal kernel space fuzzer 370 may target a specific subsystem of the kernel space 250. An internal kernel space fuzzer 370 may use sequences of Syscalls and arguments to trigger vulnerabilities within the kernel space 250. An internal kernel space fuzzer 370 may target drivers, file systems, registry hives, code integrity, graphic drivers, and other subsystems in the kernel space 250.

Figure 3C:
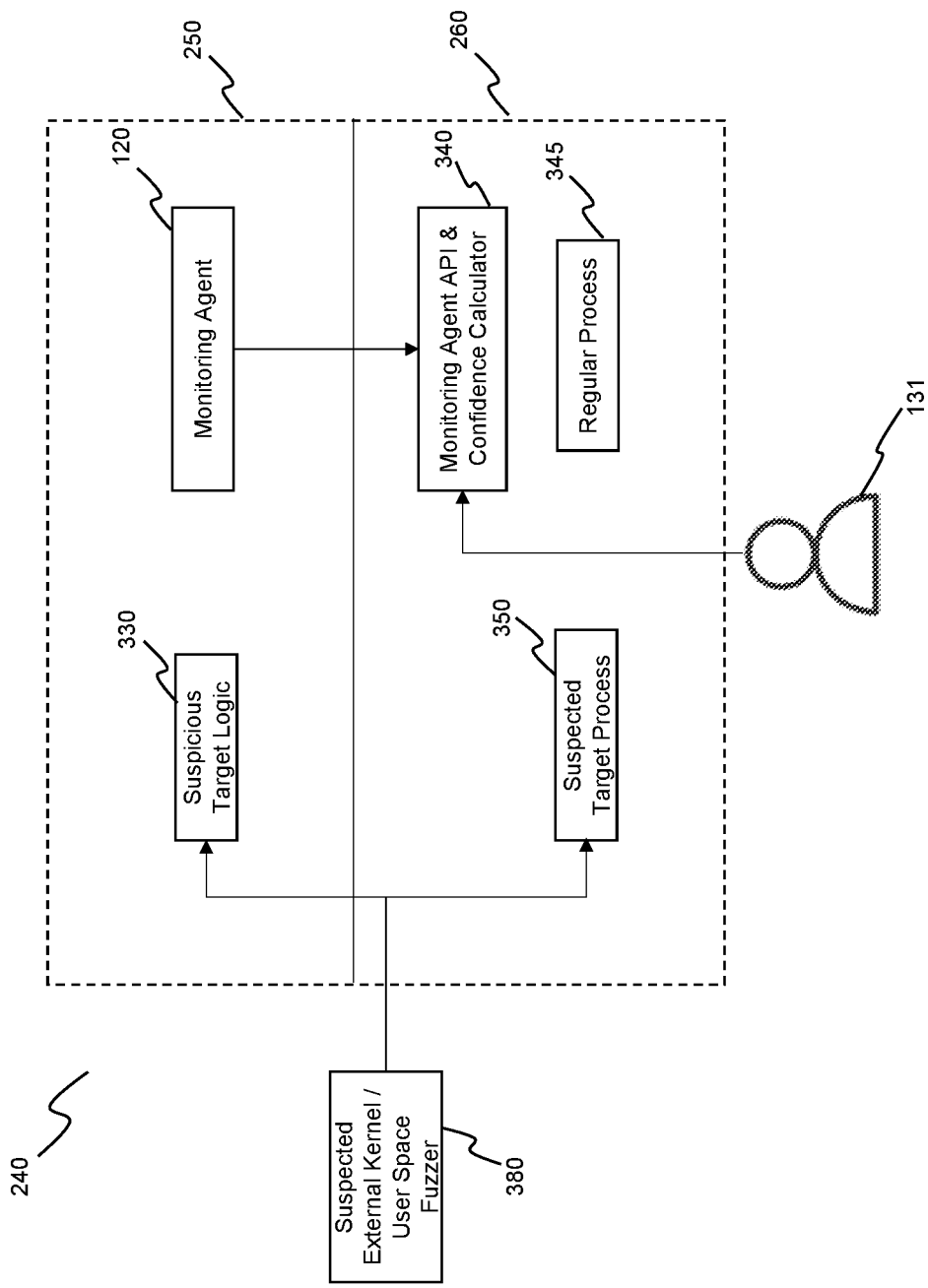
FIG. 3C is a block diagram showing an exemplary system for detecting an external kernel and user space fuzzer associated with a target program.

In other embodiments as shown in FIG. 3C, an external kernel and user space fuzzer 380 may be present separate from the user space 260 and kernel space 250. An external kernel and user space fuzzer may indicate a fuzzer program is operating outside of the virtual memory 240 of computing device 130. For example, an external kernel and user space fuzzer may include programs operating on additional external computing devices, virtual machines, or other devices and operating systems operating within network 110. The disclosed methods and techniques may be used to detect an active fuzzer when the fuzzer operates in internal user space, internal kernel space, or a fuzzer operating externally to the user space or internal kernel space.

Figure 4:
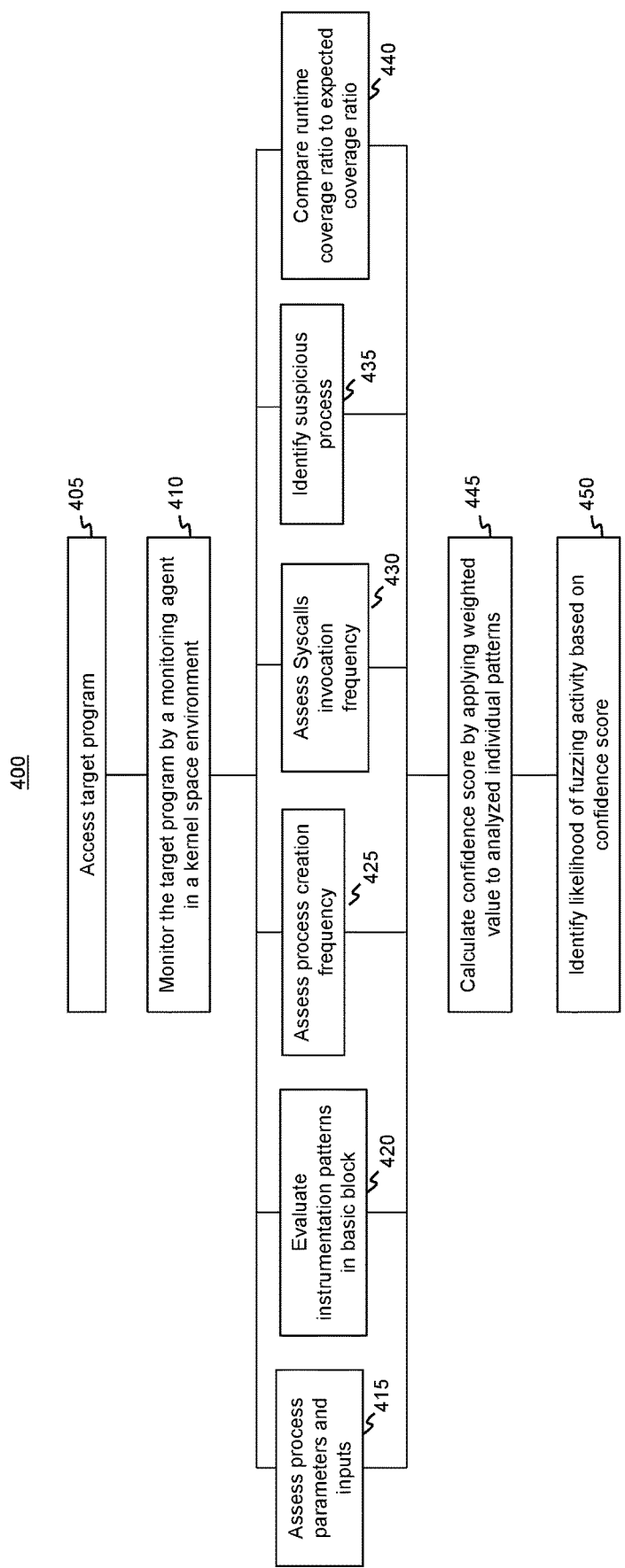
FIG. 4 is a flowchart depicting an exemplary process for detecting fuzzing activity associated with a target program.

FIG. 4 is a block diagram depicting an exemplary process 400 for detecting fuzzing activity in a target program. Step 405 of process 400 may include accessing a target program. A target program, as defined above, may include any specific set of ordered operations for a computer to perform. For example, a target program may refer to an application program such as word processors, game programs, spreadsheets, database systems, graphics programs, web browsers, or any other application program utilized by users. A target program may also refer to systems programs such as operating systems, networking systems, database systems, programming language software, website servers, data backup, or any other system program used for monitoring and controlling hardware and software. A target program may run in the user space or kernel space.

Accessing a target program may involve retrieving data through any electrical medium such as one or more signals, instructions, operations, functions, databases, memories, hard drives, private data networks, virtual private networks, Wi-Fi networks, LAN or WAN networks, Ethernet cables, coaxial cables, twisted pair cables, fiber optics, public switched telephone networks, wireless cellular networks, Bluetooth™, Bluetooth LE™ (BLE), Wi-Fi, near field communications (NFC), or any other suitable communication method that provide a medium for exchanging data. In some embodiments, accessing information may include adding, editing, deleting, re-arranging, or otherwise modifying information directly or indirectly from the network. A monitoring agent may access the target program using a user device, which may include a computer, laptop, smartphone, tablet, VR headset, smart watch, or any other electronic display device capable of receiving and sending data. In some embodiments, accessing the target program may include retrieving the target program from a web browser cache. Additionally or alternatively, accessing the target program may include connecting with a live data stream of the target program from a remote source. In some embodiments, accessing the target program may include logging into an account having a permission to access the target program. For example, accessing the target program may be achieved by interacting with an indication associated with the target program, such as an icon or file name, which may cause the system to retrieve (e.g., from a storage medium) a target program associated with the indication. Accessing a target program may also include retrieving data from computing device 130, database 140, server 150, and may occur through transmittal of data across network 110.

At step 410 the monitoring agent, in a kernel space environment, may monitor the target program. Monitoring the target program may include examining the execution state during the execution of target programs. For example, monitoring the target program may include examining specific system signals, crashes, or other violations. In some embodiments, monitoring the target program may include examining one or more processes associated with the target program that are running in system memory. Monitoring may occur over a period of time. For example, monitoring the target program may include examining processes and signals at a first time and again at a second time and comparing the similarities and differences between the processes and signals associated with each time.

Monitoring the target program may take place in a kernel space environment. A kernel space environment may include a computer program in a computer operating system's core. For example, a kernel space environment may facilitate interactions between hardware and software components. A kernel space environment may control hardware resources via device drivers, arbitrate conflicts between processes, monitor the amount of memory being used, and optimize the utilization of resources. The kernel space environment may include a monolithic kernel, micro-kernel, hybrid kernel, ex-kernel, nanokernel, or any other space that controls and monitors the hardware and software components of an operating system.

The dynamic and static patterns of the target program may be analyzed. Dynamic patterns of the target program may include sequences of method calls and interactions of objects. Static patterns of the target program may include structural and component interconnections set at compile- or link-time. Analyzing the dynamic and static patterns of the target program may include assessing process parameters and inputs 415, evaluating instrumentation patterns in at least one basic block 420, assessing process creation frequency 425, assessing Syscall invocation frequency 430, identifying suspicious processes 435, or comparing a runtime coverage ratio of a process to an expected coverage ratio 445.

At step 415 the analysis of the dynamic and static patterns of the target program may include assessing process parameters and inputs. Assessing process parameters or inputs may include examining a similarity of two to or more process environment blocks or process control blocks or monitoring process command line arguments and external inputs. A process environment block may include an opaque data structure used by the operating system. For example, a process environment block may include a data structure that applies across a whole process, including global context, startup parameters, data structures for the program image loader, program image base address, and synchronization objects used to provide mutual exclusion for process-wide data structures. A process control block may include a data structure used by a computer operating system to contain information about its related process. For example, a process control block may include a process state, process number, program counter, registers, memory limits, CPU scheduling information, list of open files, memory management information, I/O status information, accounting information, and any other information relating to the process. A process command line argument may include arguments from a user that affect the operation of a process when the process is invoked. For example, the process command line argument may add more features, specify a default document to launch, or enable certain features within a process. External inputs may include data or control information that comes from outside an application boundary. For example, the external inputs may come from a data input screen or another application and may add, change, or delete information on an internal process.

Assessing process parameters or inputs 415 may further include detecting external inputs through one or more or open handles, file descriptors, shared memory, or external API calls. An open handle may include an abstract reference to a resource that is used when application software references blocks of memory. For example, an open handle may be a file descriptor, network socket, database connection, process identifier, job ID, or any other references to a resource. A file descriptor may include a unique number that identifies an open file in a computer operating system created by the kernel in response to an open call. A file descriptor may include a file reference which represents the underlying data and a file position which is an offset into the file. For example, file descriptors may refer to directories, block and character devices, a network connection, or any other file in a computer operating system. A shared memory may include memory that can be concurrently accessed by multiple programs to avoid redundant copies and provide communication among the multiple programs. For example, a shared memory may use uniform memory access, non-uniform memory access, or cache-only memory architecture. An external application programming interface (API) call may include a process for a user application to submit a request to an API and for the API to retrieve the requested data from an external program for the user. For example, an API c all may include a process that occurs when a user sends a request after setting up an API with correct endpoints. The user's request is transferred and processed, and feedback is returned to the user.

Assessing process parameters or inputs 415 may further include identifying a first input, comparing subsequent inputs to the first input to measure covariance of the subsequent inputs to identify input mutation, and comparing the covariance to statistical thresholds of known fuzzing mutation methods. A first input may include a fuzzer's first generated code string that it inputs into the target program. For example, a first input may include a random, invalid, unexpected, or semi-valid input to the target program. A subsequent input may include a fuzzer's later inputs to the target system after the first input. For example, a subsequent input may be a mutation of the first input, may be generated by the fuzzer from scratch, may be generated based on known valid or semi-valid inputs, or may be any other input from the fuzzer to the target program after a first input.

Comparing the first input to the second input may include measuring the covariance of the subsequent input to identify input mutation. A covariance may include a measuring the relationship between two variables to evaluate the extent to which the variables change together. For example, a positive covariance may indicate that the two variables tend to move in the same direction while a negative covariance may indicate that the two variables tend to move in inverse directions. A covariance may be calculated of "n" subsequent inputs. An input mutation may include a change of variable in the input. For example, the input mutation may include inserting a variable in an input, deleting a variable in an input, or any other alteration between subsequent inputs.

Some fuzzing mutation methods may include performing mutations on a set of valid inputs to elicit errors from the target program. For example, certain fuzzing methods may include bit flipping, appending a random string to the end of the first input, or any other mutation of variables in an input. Some fuzzing methods may use templates of the data structure supplied to the target program to ensure the mutated input meets the target program's format expectation. The system may compare the covariance of the subsequent inputs to a statistical threshold of the fuzzing mutations. For example, if the covariance between a first input and subsequent inputs is above a statistical threshold, then that may indicate that there is fuzzing activity. If the covariance between a first input and subsequent inputs is below a statistical threshold, that may indicate that fuzzing activity may not be occurring.

At step 420 the analysis of the dynamic and static patterns of the target program may include evaluating instrumentation patterns in at least one basic block. Instrumentation patterns may include a measure of the target program's performance, errors, and trace information reflecting the target program's state. For example, instrumentation patterns may include static and dynamic instrumentation patterns. Dynamic instrumentation may include analyzing the runtime behavior of the target process. For example, a dynamic instrumentation pattern may simulate caches, detect memory allocation errors, detect security violations, or model system performance. Static instrumentation patterns may include inserting specific code into a binary file before binary execution without affecting the execution of the target process.

A basic block may include a straight-line code sequence with only one branch in at the entry and only one branch out at the exit. For example, the code sequence may be a source code, assembly code, or any other sequence of instructions. A basic block may comprise code sequences in which the instruction at each position always executes before instructions at later positions and no other instructions may execute between two instructions in the sequence. Evaluating instrumentation patterns in a basic block may include analyzing a new basic block to catch a fuzzer's "code signature." Entering a basic block may include performing a static analysis of the basic block. For example, entering a basic block may include examining the source code of the target program without running the target program and comparing the source code to a set of preestablished coding rules. A fuzzer code signature may be a unique arrangement of information that can be used to identify a fuzzer's attempt to monitor and exploit a target program. For example, a fuzzer's "code signature" may include certain elements such as the presence of a two-dimensional array in the fuzzer's memory. Catching a fuzzer's "code signature" in a basic block may include identifying a pattern in the form of a state machine in the fuzzer's memory. If a fuzzer's code signature is identified in a basic block, that may indicate the presence of an active fuzzer in association with the target program. If a fuzzer's code signature is not identified in a basic block, that may indicate that an active fuzzer is not present in the target program.

In other embodiments, evaluating instrumentation patterns may include identifying a report by at least one basic block to a repository associated with the target program. For example, some active fuzzers may be considered "smart fuzzers." A smart fuzzer may be aware of a target program's input structure or program structure and may generate updated inputs based on a response by the program to the fuzzer's output data. A smart fuzzer may log the response of a target program and send the log to a repository. The data logs stored in the repository may be used to refine or evolve the fuzzer output on subsequent fuzzing attempts. Identifying a report by at least one basic block to a repository may indicate an active fuzzer is present in the target environment.

In another embodiment, evaluating instrumentation patterns may include performing a static analysis of a source code file. Source code may include any collection of code written using a human-readable programming language. For example, a source code may be readable by humans, but may be converted to an object code or machine language for a computer to read or execute the code. Source code may be compiled source code, interpreted source code, computer source code, software program source code, software feature source code, or any other code that is human-readable.

A static analysis may include an analysis of source code without executing the application. For example, a static analysis may be used to detect security vulnerabilities, performance issues, non-compliance with standards, or other analyses of the source code. A static analysis may follow a formal method including mathematical analysis such as denotational semantics, axiomatic semantics, operational semantics, and abstract interpretation. A static analysis may also include a data-driven static analysis to infer coding rules.

At step 425 the analysis of the dynamic and static patterns of the target program may include assessing process creation frequency. Assessing process creation frequency may indicate the presence of a fuzzer. For example, fuzzing programs are known to generate a high frequency of processes with identical or similar binaries. The higher the frequency of processes with similar or identical binaries, the more likely an active fuzzer is present. Assessing process creation frequency may comprise identifying process unique identifiers of a first process, identifying immutable sections of the first process by calculating a cryptographic hash of a section of the process code, and determining a degree of variation of at least one subsequent process based on the unique identifiers and the immutable sections of the first process. A process unique identifier may include a number used by an operating system kernel to uniquely identify an active process. For example, a process unique identifier may only identify a process during the lifetime of the process and does not identify processes that are no longer active. A process unique identifier may be found in the kernel of an operating system such as UNIX™, Mac OS X™, or Windows NT™.

A cryptographic hash may include a mathematical algorithm that maps data of an arbitrary size to a hash value, which is a bit array of a fixed size. For example, a cryptographic hash may be a one-way function that cannot feasibly be inverted or reversed. Further, a given first set of input data must always generate the same hash value, and any change in the first set of input data will result in a distinct hash value. Calculating a cryptographic hash may be accomplished by a cryptographic hash function. For example, a cryptographic hash may be calculated using a secure hash algorithm such as Message Digest (MD), Secure Hash Function (SHA), RACE Integrity Primitives Evaluation Message (RIPEMD), Whirlpool, or any other secure hash algorithm.

Analyzing cryptographic hash values between different processes may reveal that certain processes contain similar immutable sections of code. For example, an immutable section of a process code can be determined by calculating a cryptographic hash of certain sections of the process code and comparing the hash to another instance of a section of process code. If the hash values are identical, the two compared processes likely are likely different iterations of a fuzzer attacking the target program.

Determining a variation of at least one subsequent process may include comparing the unique identifiers and immutable sections of the first process to the subsequent processes. For example, the degree of variation of at least one subsequent process may include determining a difference in the process unique identifier of the first process and the at least one subsequent process. Further, the degree of variation of at least one subsequent process may also include determining the difference between hash values of the immutable sections of the first process and the at least one subsequent process. If the similarity between the unique identifiers and immutable sections of the first process and subsequent process is below a certain threshold, then that may indicate the presence of an active fuzzer. If the similarity between the unique identifiers and immutable sections of the first process and subsequent process is above a certain threshold, that may indicate that an active fuzzer is not present.

In other embodiments, assessing process creation frequency may include comparing base images of a first and second process, comparing process names of a first or second process, or examining process environment block or process control blocks for common structures. A base image may include a read-only image that is used to create container images. For example, a base image may be an official Docker base image, modifications of a Docker image, a base image made from scratch, or any other image used to create container images. A base image may also be a basic Linux distribution such as Debian, Ubuntu, Redhat, Centos, or Alpine. A process name may be derived from the executable file name containing the program being run. For example, a process name may be used to register application defaults and may be used in error messages. A process environment block may include an opaque data structure used by the operating system. For example, a process environment block may include a data structure that applies across a whole process, including global context, startup parameters, data structures for the program image loader, program image base address, and synchronization objects used to provide mutual exclusion for process-wide data structures. A process control block may include a data structure used by a computer operating system to contain information about its related process. For example, a process control block may include a process state, process number, program counter, registers, memory limits, CPU scheduling information, list of open files, memory management information, I/O status information, accounting information, and any other information relating to the process.

Comparing base images of a first and second process, comparing process names of a first or second process, or examining process environment block or process control blocks for common structures may include evaluating the similarity of the base image, process name, process environment block, or process control block between the first and second process. Generation of similar processes with common names, common environment blocks, or common base images may indicate the presence of a fuzzer. For example, a fuzzer may generate the same, or substantially similar, processes with common names, environment blocks, or base images to identify inputs that may crash the target program. The mutations in processes by a fuzzer may be minor so that the fuzzer can identify specific inputs that cause target program crashes. When comparing a first and second process, if the similarity between the first process and the second process is below a certain threshold, then that may indicate the presence of an active fuzzer. If the similarity between the first process and second process is above a certain threshold, that may indicate that an active fuzzer is not present.

At step 430, the analysis of the dynamic and static patterns of the target program may include assessing Syscall invocation frequency. Assessing Syscall invocation frequency may include calculating a baseline frequency of expected Syscalls and comparing an invocation frequency to the baseline frequency. A Syscall may include a mechanism to interface between a process and operating system. For example, a Syscall may include the method in which a computer program requests a service from the kernel of the operating system. Syscalls may be used to read or write from files, create or delete files, create or manage new process, send or receive packers over network connections, or access hardware devices such as scanners or printers. Syscalls may include process control, file management, device management, information management, and communication functions. Invoking a Syscall may include executing the Syscall instruction by the processor in the kernel space. A baseline frequency of expected Syscalls may include determining the maximum times a particular Syscall is expected to be invoked in a given time period.

Comparing an invocation frequency to a baseline frequency may include tracking system calls using a system call monitor to determine invocation frequency. A target program may monitor Syscall by using a kernel API to hook a process's Syscall invocation. The system may log an entry for each Syscall, which may reference information such as the date, time, and process tree for the process that made the Syscall. The system may then compare the invocation frequency to the calculated baseline frequency. For example, if the invocation frequency is higher than the baseline frequency, then that may indicate that an active fuzzer is present. If the invocation frequency is lower than the baseline frequency, then that may indicate that an active fuzzer is not present. Active fuzzers may make frequent use of the same Syscall to identify crashes in the target program. Unlike a normal software operation, a fuzzer may invoke the same Syscall hundreds or thousands of times while attacking a target program, so a high invocation frequency of a particular Syscall may indicate the presence of an active fuzzer. For example, in some embodiments, the baseline frequency may be approximately five per second for a particular Syscall.

At step 435, the analysis of the dynamic and static patterns of the target program may include identifying suspicious processes. Identifying suspicious processes may include, for example, identifying a bitmap structure, identifying an existence of a state machine in a process shared memory, or identifying certain correlations between a process's execution frequency and its structure update frequency. A process shared memory may include memory that can be concurrently accessed by multiple programs to avoid redundant copies and provide communication among the multiple programs. For example, a shared memory may use uniform memory access, non-uniform memory access, or cache-only memory architecture.

A state machine may include a behavioral model that consists of a finite number of states. For example, based on the current state and a given input, the state machine may perform state transitions and produce outputs. State machines may include Mealy machines, Moore machines, Harel statecharts, and UML statecharts. A state machine may define states based on dynamically generated information stored in, for example, counters or bitmaps. For example, a bitmap may be generated in which each bit may be associated with one basic block in the code. If a basic block is hit, the corresponding bit may be set to 1 and if the basic block is not hit the corresponding bit may be set to 0. Many fuzzer's or fuzzer profiles rely on a state machine to generate successive target inputs to a target program. Therefore, identifying the existence of a state machine in a process shared memory may indicate a fuzzer is likely present. Monitoring agent 120 may analyze suspected target process 350 through static and dynamic analysis to detect the presence of state machines in the process shared memory.

A process's execution frequency may specify both how often a process may run and at what time it will run. An execution frequency may also identify the frequency with which a block of code is executed. A suspicious process execution may be identified if a suspicious process was executed by a scheduled task, if a suspicious file type was directly executable by the system, if a suspicious process is named to appear to be a legitimate process, or if a suspicious process is named with random letters and numbers. Process execution may be identified in logs generated by operating systems and the execution frequency may be determined by identifying the frequency with which specific process were executed on the log.

A process's structure update frequency may represent a frequency that a process or group of processes updates its code structure. A fuzzer may generate certain processes that both execute frequently and update their structures frequently. For example, a process generated by a fuzzer may update its structure each time it executes, or every other time, or at certain specified time intervals. Monitoring agent 120 may identify correlations between a process's execution frequency and a process's structure update frequency which may indicate a an fuzzer is likely present.

At step 440, the analysis of the dynamic and static patterns of the target program may include comparing a runtime coverage ratio of a process to an expected coverage ratio. The expected coverage ratio may be determined by building a runtime graph of the target process in a test environment and comparing the runtime graph to a static graph. Runtime code coverage may include an identification of what code is running, what code paths are being executed, and the number of times a code path is executed while a process is running. For example, runtime code coverage may include coverage information on statement blocks, decisions, and loops, function or procedure calls, basic conditions, modified conditions/decisions (MC/DC), multiple conditions, and forced conditions, process entries and exits, or terminal statements. A runtime graph may display code coverage of the process over the runtime of the process.

A test environment may include any space where software undergoes experimental tests and uses. For example, the elements of a test environment may include the software to be tested, software to interface between the system and applications, test data, the operating system, database, and testing server, network configuration, desktops or mobile devices on which the software is to be tested. A test environment may be a sandbox environment which enables isolated execution of software for independent evaluation, monitoring, or testing. In some embodiments, the test environment may be comprised of an isolated virtual machine that is inaccessible to external fuzzers. A virtual machine may include a computer resource that uses software, rather than physical components of a computer, to run processes. For example, each virtual machine may run its own operating system and function separately from other virtual machines. An isolated virtual machine may comprise an isolated test environment that has access to a subset of physical resources of the computer system. For example, an isolated virtual machine may be a process virtual machine or a system virtual machine. An isolated virtual machine may prevent external users, such as fuzzers, from entering the virtual machine. More generally, a test environment may be any environment where a program operates without the presence of a fuzzer.

A static graph may be a representation of calling relationships between subroutines in a process and is created without running the process. For example, a static graph may represent every possible run of the process. A static graph may show every call relationship that may occur in a process. The expected coverage ratio may be determined by comparing the runtime graph created in the test environment to the static graph.

The runtime coverage ratio may be determined by comparing a runtime graph of the target process to a static graph of the target process. The runtime graph may be generated by running the process outside an isolated test environment. For example, the runtime graph may be created through an environment in which fuzzers may be present. A static graph of the target process may be a representation of calling relationships between subroutines in a process and is created without running the process.

The system may compare the expected coverage ratio to the runtime coverage ratio of the target process to determine the difference between the coverage ratios. If the difference between the runtime coverage ratio and the expected coverage ratio is above a certain threshold, that may indicate the presence of an active fuzzer. If the difference between the runtime coverage ratio and the expected coverage ratio is below a certain threshold, that may indicate that an active fuzzer is not present. For example, certain processes, Syscalls, or executions may occur in the runtime environment that do not occur in the test environment. By comparing the coverage ratio between the runtime coverage ratio to the expected coverage ratio generated in the test environment, suspicious or unexpected processes may be identified which may indicate the presence of an active fuzzer.

Analyzing static and dynamic patterns of the target program may involve analyzing at least two patterns as disclosed above in steps 415, 420, 425, 430, 435, and 440. For example, monitoring agent may analyze any combination of static and dynamic patterns of the target program to detect an active fuzzer. While the monitoring agent may analyze every static and dynamic pattern, not all static and dynamic patterns may be present in a target program. Additionally, even if each static and dynamic pattern is present in a target program, the monitoring agent may not analyze each pattern.

At step 445, a confidence score may be calculated. Calculating the confidence score may include applying a weighted value to an analyzed individual pattern based on the analysis. For example, a value between 0 and 1 may be applied to each analyzed dynamic and static patterns of the target program. If an analyzed dynamic or static pattern of the target program does not indicate fuzzing activity, then a value of 0 is applied to that pattern. If an analyzed dynamic or static pattern of the target program indicates the presence of a fuzzer, then a value is assigned to that indication. The weighted value applied to each dynamic and static pattern is determined based on the level of confidence that a fuzzer is present in the target program based on the analysis of that individual dynamic or static pattern. For example, a weighted value of 0.75 may be applied to the dynamic process creation frequency pattern if analysis of this pattern indicates the presence of an active fuzzer. The system may then calculate the confidence score by adding the weighted values applied to each individual pattern.

At step 450, a likelihood of fuzzing activity may be identified based on the confidence score. If the confidence score is above a certain threshold, then that may indicate the presence of fuzzing activity. If the confidence score is below a certain threshold, then that indicates a lower likelihood of fuzzing activity.

In some embodiments, a security action may be performed based on the confidence score. A security action may be any function that logs, alerts, reports, blocks, allows, an action associated with the security policy.

In some embodiments, performing the security action may include generating an alert. The alert may be any visual, audio, or haptic feedback that notifies a user of the hidden secret. For example, the alert may be displayed via text or graphics on a computer or other user device. Other examples include alarms, audio pings, or other audio feedback indicating the probability, as well as electronically transmitted messages (e.g., email, SMS, etc.).

In other embodiments, performing the security action may include generating a report. The report may be a text-based report or a visual indicator of a hidden secret such as a pop-up display or user prompt. The report may include audio alerts or warnings indicating a failure in a build script. In another embodiment, the security action may include blocking an action or allowing an action. In another embodiment, the security action may include suspending the target program. In another embodiment, the security action may include prompting a user for administrative approval to continue a process or may include revoking permissions.

In some embodiments, the integrity of the monitoring agent may be verified, and a trust relationship may be established between the monitoring agent and the target program. Verifying the integrity of the monitoring agent may include confirming that the monitoring agent is genuine or confirming that the monitoring agent has not been modified. A trust relationship is a logical link established between a trusting domain and a trusted domain. For example, when a trust relationship is established, the trusting domain honors the authentication of the trust domain. A trust relationship may allow a user from the trusted domain to access resources in the trusting domain. A trust relationship may be established automatically or manually.

Figure 5:
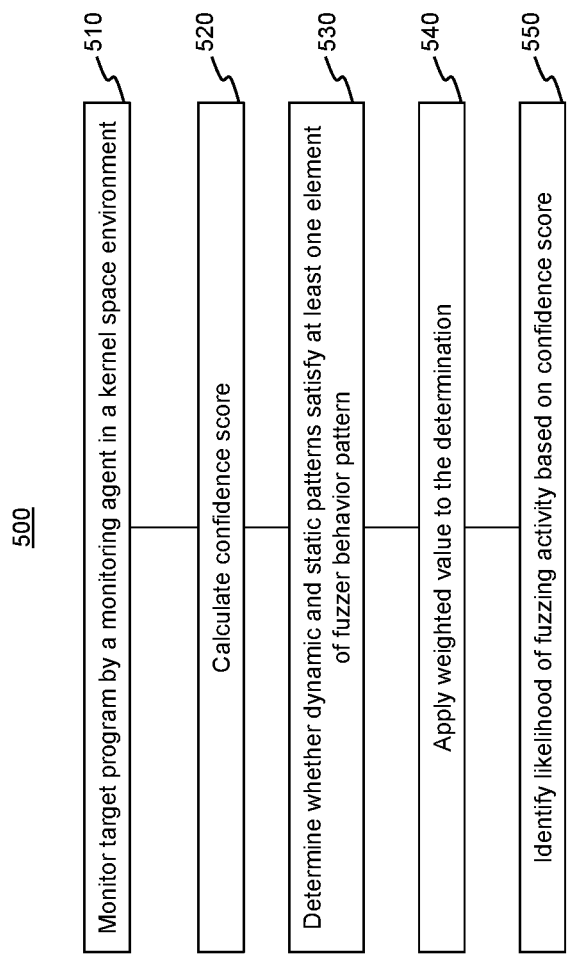
FIG. 5 is a flowchart depicting another exemplary process for detecting fuzzing activity attacking a target program through monitored dynamic and static patterns of the target program.

FIG. 5 is a block diagram depicting an exemplary process 500 performed by a non-transitory computer readable medium for detecting fuzzing activity attacking a target program. Process 500 may correspond to process 400 depicted as a block diagram in FIG. 4. Accordingly, the descriptions and methods described above with respect to process 400 may equally apply to process 500.

At step 510, computer readable medium 500 may include monitoring a target program by a monitoring agent in a kernel space environment. Step 510 may correspond with step 410 of process 400 as described herein.

At step 520, computer readable medium 500 may include calculating a confidence score based on a comparison of monitored dynamic and static patterns of the target program to a predefined fuzzer behavior profile. Monitored dynamic and static patterns of the target program may include assessing process parameters and inputs, evaluating instrumentation patterns in at least one basic block, assessing process creation frequency, assessing Syscall invocation frequency, identifying suspicious processes, or comparing a runtime coverage ratio of a process to an expected coverage ratio. Monitored dynamic and static patterns of the target program may correspond with steps 415, 420, 425, 430, 435, and 440 of process 400.

A predefined fuzzer behavior profile may include an analysis of the specific behavior and characteristics of an active fuzzer that delineates logical pathways from behavior to factors influencing the behavior. For example, a fuzzer behavior profile may include known characteristics of active fuzzers such as the existence of a state machine in a shared memory of the target program, high process creation frequency, high gap in the coverage of a target process in sandbox execution and runtime coverage, high Syscall invocation frequency, or any other characteristic portrayed by an active fuzzer.

Calculating a confidence score may include determining whether one or more dynamic and static patterns satisfies at least one element of the fuzzer behavior profile and applying a weighted value to the determination. These steps 530 and 540 may correspond with step 445 of process 400.

In other embodiments, applying a weighted value to the determination may be based on an importance score assigned to elements of the fuzzer behavior profile. An importance score may be assigned by a user to accommodate varying runtime scenarios and environments of the target program. For example, an importance score may indicate that a particular element of the fuzzer behavior profile is more likely to indicate active fuzzing activity while another element of the fuzzer behavior profile may be less likely to indicate active fuzzing activity. An importance factor may increase or decrease the weight assigned to a determination of fuzzing activity.

At step 550, computer readable medium 500 may include identifying a likelihood of fuzzing activity based on the confidence score. Step 550 may correspond with step 450 of process 400.

In some embodiments, a security action may be performed based on the confidence score. A security action may be any function that logs, alerts, reports, blocks, allows, an action associated with the security policy as previously described herein.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments unless the embodiment is inoperative without those elements.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A computer-implemented method for detecting active fuzzing activity associated with a target program, comprising:
   accessing a target program running in a kernel space environment or a user space environment;
   executing a monitoring agent in the form of a kernel module deployed in the kernel space environment;
   monitoring, by the monitoring agent in the form of the kernel module deployed in the kernel space environment, one or more processes associated with the target program that are running in system memory;
   analyzing dynamic and static patterns of the target program, wherein the analyzing comprises at least two of:
      assessing process parameters and inputs;
      evaluating instrumentation patterns in at least one basic block;
      assessing process creation frequency;
      assessing Syscalls invocation frequency;
      identifying suspicious processes; or
      comparing a runtime coverage ratio of a process to an expected coverage ratio;
   calculating a confidence score based on the analysis of the dynamic and static patterns of the target program, wherein the calculating includes applying a weighted value to an analyzed individual pattern based on the analysis of the dynamic and static patterns of the target program;
   identifying a likelihood of active fuzzing activity associated with the target program based on the confidence score; and performing a security action based on the confidence score.

2. The computer-implemented method of claim 1, wherein assessing the process parameters and the inputs comprises at least one of:
examining a similarity of two or more process environment blocks or process control blocks; or
monitoring process command line arguments and external inputs.

3. The computer-implemented method of claim 2, wherein assessing the process parameters and the inputs further comprises detecting external inputs through one or more of:
open handles,
file descriptors,
shared memory, or
external application programming interface (API) calls.

4. The computer-implemented method of claim 1, wherein assessing the process parameters and the inputs comprises:
identifying a first input;
comparing subsequent inputs to the first input to measure covariance of the subsequent inputs to identify input mutation; and
comparing the covariance of the subsequent inputs to statistical thresholds of known fuzzing mutation methods.

5. The computer-implemented method of claim 1, wherein evaluating the instrumentation patterns in the at least one basic block includes identifying a report by the at least one basic block to a repository associated with the target program.

6. The computer-implemented method of claim 1, wherein evaluating the instrumentation patterns in the at least one basic block includes performing a static analysis of a source code file.

7. The computer-implemented method of claim 1, wherein assessing the process creation frequency comprises:
identifying unique identifiers of a first process;
identifying immutable sections of the first process by calculating a cryptographic hash of a section of code of the first process; and
determining a degree of variation of at least one subsequent process based on the unique identifiers and the immutable sections of the first process.

8. The computer-implemented method of claim 1, wherein assessing the process creation frequency comprises:
comparing base images of a first and second processes;
comparing process names of a first and second processes; or
examining process environment blocks or process control blocks for common structures.

9. The computer-implemented method of claim 1, wherein assessing the Syscalls invocation frequency comprises:
calculating a baseline frequency of expected Syscalls; and
comparing an invocation frequency to the baseline frequency of the expected Syscalls.

10. The computer-implemented method of claim 9, wherein the baseline frequency of the expected Syscalls is five per second for a particular Syscall.

11. The computer-implemented method of claim 1, wherein identifying the suspicious processes comprises at least one of:
identifying an existence of a state machine in a process shared memory; or
identifying correlations between the one or more processes' execution frequency and structure update frequency.

12. The computer-implemented method of claim 1, wherein the expected coverage ratio is determined by:
building a runtime graph of the target program in a test environment; and
comparing the runtime graph of the target program to a static graph of the target program.

13. The computer-implemented method of claim 12, wherein the test environment comprises an isolated virtual machine that is inaccessible to external fuzzers.

14. The computer-implemented method of claim 1, wherein the runtime coverage ratio of the process is determined by comparing a runtime graph of the target program to a static graph of the target program.

15. The computer-implemented method of claim 1, wherein the security action comprises at least one of:
generating an alert;
generating a report;
blocking an action;
allowing an action;
suspending the target program;
prompting a user for administrative approval; or
revoking permissions.

16. The computer-implemented method of claim 1, further comprising:
verifying an integrity of the monitoring agent; and
establishing a trust relationship between the monitoring agent and the target program.

17. A non-transitory computer readable medium storing instructions that, when executed by at least one processor, cause the at least one processor to perform operations for detecting active fuzzing activity associated with a target program, comprising:
accessing a target program running in a kernel space environment or a user space environment;
executing a monitoring agent in the form of a kernel module deployed in the kernel space environment;
monitoring, by the monitoring agent in the form of the kernel module deployed in the kernel space environment, one or more processes associated with the target program that are running in system memory;
calculating a confidence score based on a comparison of monitored dynamic and static patterns of the target program to a predefined fuzzer behavior profile, wherein calculating the confidence score includes:
determining whether one or more monitored dynamic and static patterns of the target program satisfy at least one element of the predefined fuzzer behavior profile; and
applying a weighted value to the determination;
identifying a likelihood of active fuzzing activity associated with the target program based on the confidence score; and
performing a security action based on the confidence score.

18. The non-transitory computer readable medium of claim 17, wherein determining whether the one or more monitored dynamic and static patterns of the target program satisfy the at least one element of the predefined fuzzer behavior profile comprises:
assessing process parameters and inputs;
evaluating instrumentation patterns in function prologues and epilogues;
assessing process creation frequency;
assessing Syscalls invocation frequency;
identifying suspicious processes; or
comparing a runtime coverage ratio of a process to an expected coverage ratio.

19. The non-transitory computer readable medium of claim 17, wherein applying the weighted value to the determination is based on an importance score assigned to elements of the predefined fuzzer behavior profile.

20. The non-transitory computer readable medium of claim 17, wherein identifying the likelihood of active fuzzing activity associated with the target program based on the confidence score includes identifying an internal user space fuzzer, an internal kernel space fuzzer, or an external fuzzer.

* * * * *